United States Patent
Dahm et al.

[11] 3,892,770
[45] July 1, 1975

[54] PHENOXYACETIC ACID DERIVATIVES AND PROCESS FOR THE PREPARATION THEREOF

[75] Inventors: Johann Dahm; Joachim Borck; Herbert Nowak; Zdenek Simane; Detlev Kayser, all of Darmstadt, Germany

[73] Assignee: Merck Patent Gesellschaft mit beschrankter Haftung, Darmstadt, Germany

[22] Filed: Sept. 4, 1973

[21] Appl. No.: 393,935

Related U.S. Application Data

[62] Division of Ser. No. 234,343, March 13, 1972, Pat. No. 3,804,839.

[52] U.S. Cl. ............................................. 260/326.1
[51] Int. Cl. ............................................. C07d 27/48
[58] Field of Search ................................ 260/326.1

[56] References Cited
UNITED STATES PATENTS
3,717,669   2/1973   Grant et al. .................... 260/473 G Primary Examiner—Joseph A. Narcavage
Attorney, Agent, or Firm—Millen, Raptes & White

[57] ABSTRACT

Compounds of the formula

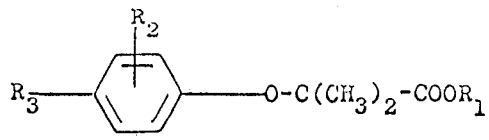

wherein $R_1$ is H or alkyl of 1–10 carbon atoms; $R_2$ is H, alkyl of 1–4 carbon atoms or halogen; and $R_3$ is pyrrolidino, piperidino, 3-hydroxypyrrolidino, 3-hydroxypiperidino, isoindolino optionally substituted in the aromatic ring by one or more alkyl, alkoxy groups and halogen or by a methylenedioxy group, 1,2,3,4-tetrahydroquinolino, 1,2,3,4-tetrahydro-4-quinolyl, 1-alkyl-1,2,3,4-tetrahydro-4-quinolyl, 1-benzimidazolyl, 2-alkyl-1-benzimidazolyl, 1-pyrryl, 1-benzotriazolyl, 2-indanyl or 4-piperidinophenyl, alkyl and alkoxy in each instance containing 1–4 carbon atoms, and salts thereof, possess cholesterol and triglyceride blood serum level-lowering and enzyme-inducing activity.

8 Claims, No Drawings

PHENOXYACETIC ACID DERIVATIVES AND PROCESS FOR THE PREPARATION THEREOF

This is a division of application Ser. No. 234,343 filed Mar. 13, 1972, now U.S. Pat. No. 3,804,839

BACKGROUND OF THE INVENTION

This invention relates to novel phenoxyacetic acids and esters thereof.

SUMMARY OF THE INVENTION

The novel 4-substituted phenoxy-acetic acids and esters thereof of this invention have the general formula I

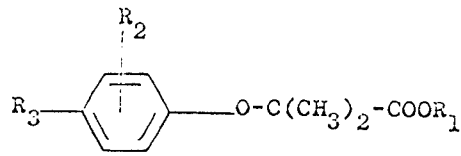
I wherein $R_1$ is H or alkyl of 1–10 carbon atoms; $R_2$ is H, alkyl of 1–4 carbon atoms or halogen, i.e., F, Cl, Br or I; $R_3$ is pyrrolidino, piperidino, 3-hydroxypyrrolidino, 3-hydroxypiperidino, isoindolino optionally substituted in the aromatic ring by one or more of alkyl, alkoxy and halogen or by a methylenedioxy group; 1,2,3,4-tetrahydroquinolino, 1,2,3,4-tetrahydro-4-quinolyl, 1-alkyl-1,2,3,4-tetrahydro-4-quinolyl, 1-benzimidazolyl, 2-alkyl-1-benzimidazolyl, 1-pyrryl, 1-benzotriazolyl, 2-indanyl or 4-piperidinophenyl, alkyl and alkoxy in each instance containing 1–4 carbon atoms; and the physiologically acceptable salts thereof with acids or bases. These compounds possess, with good compatibility, excellent cholesterol and triglyceride blood serum level-lowering and enzyme-inducing activities. They can therefore be employed as drugs and also as intermediate products for the preparation of other drugs.

Particularly preferred are those compounds of the formula I wherein $R_3$ contains at least one nitrogen atom.

DETAILED DISCUSSION

Of the compounds of this invention, preferred are those of Formulae I*a* through I*h*, wherein $R_1$ is H or alkyl of 1-4 carbon atoms and $R_2$ has the value given above:

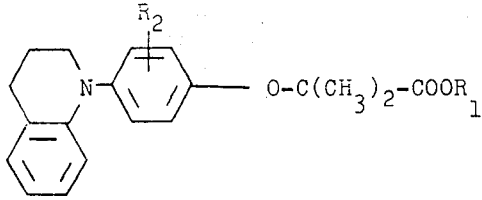
Ia wherein $R_4$ is H or OH and n is 1 or 2;

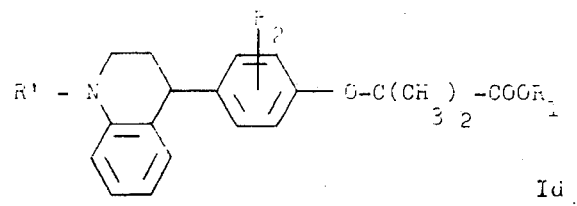
Ib wherein the aromatic ring of the isoindolino group is unsubstituted or optionally substituted by one or more of alkyl, alkoxy and halogen or by a methylenedioxy group;

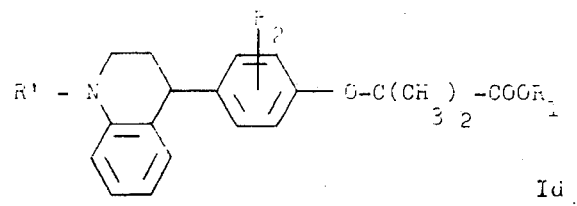
Ic

Id wherein R' is H or alkyl of 1–4 carbon atoms;

Ie wherein Q is CH, C-alkyl in which alkyl is of 1–4 carbon atoms or N;

If

Ig

Ih especially compounds of each of Formulae I and I*a* through I*h*, wherein $R_1$ is H, $CH_3$ or $C_2H_5$ and/or wherein $R_2$ is H.

In its process aspect, this invention relates to a process for the production of compounds of general Formula I, including the physiologically acceptable salts thereof with acids or bases, which comprises:

a. reacting a phenol of Formula II

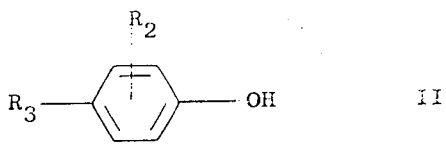

wherein $R_2$ and $R_3$ have the values given above, with a compound of the formula $X-C(CH_3)_2-COOR_1$ (III) wherein X is an optionally esterified OH, Cl, Br or I, and $R_1$ has the values given above, or with a haloform and acetone in the presence of a condensation agent; or b. a compound of Formula IV

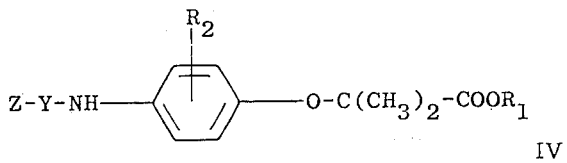

wherein Y is tetramethylene, pentamethylene, 2-hydroxytetramethylene, 2-hydroxypentamethylene, or o-xylylene optionally substituted in the aromatic ring by one or more of alkyl, alkoxy and halogen, or by a methylenedioxy group, Z is Cl, Br, I, $NH_2$ or an optionally esterified or etherified OH-group, and $R_1$ and $R_2$ have the values given above, is treated with cyclizing agents; or c. a compound of Formula V

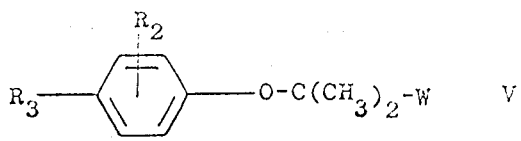

wherein W is an optionally functionally modified COOH group, and $R_2$ and $R_3$ have the values given above, is treated with a solvolyzing, thermolyzing, or ester-forming agent, thereby converting W into the group $COOR_1$; and optionally a thus-produced compound of Formula I is converted, by treatment with an acid or base, into a physiologically acceptable acid addition, metallic or ammonium salt thereof, and/or a compound of Formula I in free base form is liberated from one of the salts thereof by treatment with a base or an acid, respectively.

In the above formulae, $R_1$ preferably is H or alkyl of 1-4 carbon atoms, in particular methyl or ethyl, and also n-propyl, isopropyl, n-butyl, isobutyl, sec.-butyl and tert.-butyl. When $R_1$ is alkyl of up to 10 carbon atoms, it can also be, e.g., n-pentyl, isopentyl, n-hexyl, n-heptyl, n-octyl, isoctyl (2-ethylhexyl), n-nonyl and n-decyl.

$R_2$ preferably is H, or, alternatively, $CH_3$ or Cl. $R_2$ can also be ethyl, n-propyl, isopropyl, n-butyl, isobutyl, sec.-butyl, tert.-butyl, fluorine, bromine or iodine.

When $R_3$ contains an alkyl group, methyl is preferred; of the alkoxy groups, methoxy is preferred; and of the halogen atoms, chlorine is preferred.

X and Z preferably are Cl or Br but can also be, e.g., free OH and I and, additionally, for example, alkylsulfonyloxy, preferably of 1-6 carbon atoms, e.g., methanesulfonyloxy, arylsulfonyloxy, preferably of 6-10 carbon atoms, e.g., benzenesulfonyloxy, p-toluenesulfonyloxy and 1- or 2-naphthalenesulfonyloxy, or acyloxy, preferably alkanoyloxy or aroyloxy of 1-7 carbon atoms, e.g., acetoxy and benzoyloxy; Z can also be $NH_2$ or, for example, an etherified OH-group of preferably 1-7 carbon atoms, e.g., methoxy, benzyloxy.

The compounds of Formula I are preferably obtained by reacting the phenols II with the isobutyric acid derivatives of Formula III. Some of the phenols II are known. Those which are novel can be produced in accordance with conventional methods, for example by splitting the methyl ethers thereof, (compounds otherwise corresponding to II, having an $OCH_3$ instead of a OH group) with HBr. The compounds III are for the most part known. The reaction of II with III can be effected by methods described in the literature. For example, the phenol II can first be converted into a salt, particularly a metallic salt, for example, an alkali metal salt, e.g., a lithium, sodium, or potassium salt.

The salt formation can be achieved, for example, by reacting the phenol with a reagent producing metallic salts, such as an alkali metal, e.g., Na; an alkali metal hydride or amide, e.g., LiH and NaH, $NaNH_2$ and $KNH_2$; a lower alkali metal alcoholate, e.g., lithium, sodium and potassium methylate, ethylate and tert.-butylate; an organometallic compound derived from a hydrocarbon, e.g., butyl-lithium, phenyllithium and phenylsodium; a metal hydroxide, carbonate or bicarbonate, e.g., LiOH, NaOH, KOH, $Ca(OH)_2$; $Li_2CO_3$, $Na_2CO_3$, $K_2CO_3$, $NaHCO_3$ and $KHCO_3$. The preparation of the salt of II is advantageously conducted in the presence of a solvent selected on the basis of its physicochemical properties, e.g., the solubility of the starting material or the reactivity of the metallic compound. Suitable solvents are, e.g., hydrocarbons, including hexane, benzene, toluene and xylene, ethers, including diethyl ether, diisopropyl ether, tetrahydrofuran, dioxane and diethylene glycol dimethyl ether, amides, including dimethylformamide, alcohols, including methanol and ethanol, ketones, including acetone and butanone and mixtures thereof.

The phenol II or preferably a salt thereof is reacted with a compound of Formula III, preferably in the presence of a diluent, for example, the solvent utilized for the preparation of the salt, another solvent or the same solvent diluted with another solvent. The reaction is normally conducted at a temperature between $-20°$ and $150°C.$, preferably between $20°$ and $120°$ C., particularly advantageously at the boiling temperature of the solvent. This reaction can be effected under an inert gas atmosphere, for example, nitrogen. However, the presence of such an inert gas is not required.

The formation of the metallic salt of the phenol II can also be conducted in situ. In this case, the phenol and compound III are reacted with each other in the presence of a salt-forming reagent or another suitable base.

In a particularly preferred method compounds II and III (X = Cl or Br, $R_1$ = $CH_3$ or $C_2H_5$) are refluxed for several hours together with an alcoholic, e.g., ethanolic, sodium alcoholate solution.

It is also possible to react a free phenol II with a hydroxy acid derivative of Formula III (X = OH), preferably in the presence of a condensation agent. Suitable condensation agents are, for example, acidic dehydration catalysts, e.g., mineral acids, including sulfuric acid or phosphoric acid, also p-toluenesulfonyl chloride, arsenic acid, boric acid, $NaHSO_4$ and $KHSO_4$, disubstituted carbonic acid esters, e.g., diaryl carbonates, including diphenyl carbonate or, in particular, dialkyl carbonates, dimethyl or diethyl carbonate and carbodiimides, e.g., dicyclohexyl carbodiimide. In case an acid is employed as the condensation agent, the reaction is suitably conducted in an excess of this acid, without the addition of further solvent, at temperatures of between 0° and 100°C., preferably between 50° and 60°C. However, it is also possible to add a diluent, e.g., benzene, toluene or dioxane. In case of a carbonate, the procedure is preferably effected at an elevated temperature, suitably from 100° to about 210° C., particularly between 180° and 200°C. In this connection, an interesterification catalyst can optionally be added, e.g., sodium or potassium carbonate or an alcoholate, e.g., sodium methylate.

Instead of reaction with compound III, the phenol II can also be reacted with a haloform, preferably chloroform or bromoform, and acetone in the presence of a condensation agent. Especially suitable as the condensation agent is a strong base, e.g., an alkali metal hydroxide, including NaOH and KOH, preferably utilized in the solid phase. This reaction is advantageously conducted in the presence of a diluent, for example, in the presence of an excess of acetone and/or chloroform. The reaction is suitably effected at temperatures of between 20° and 150° C., preferably at the boiling temperature and if necessary, in a sealed vessel, e.g., an autoclave, and/or under an inert gas atmosphere, e.g., nitrogen. The reaction times range generally between 3 and 40 hours.

Compounds of Formula IV can be cyclized to compounds of Formula I in accordance with methods described in the literature, e.g., by heating in the presence or absence of a solvent, optionally in the presence of an acidic or basic catalyst.

Compounds of Formula IV can be produced, for example, by reacting a compound of the formula Z—Y—Z (VI) wherein Y has the values given above and the two groups Z which can be identical or different, in addition to the values given above can also collectively be O or NH, with a compound of the Formula VII.

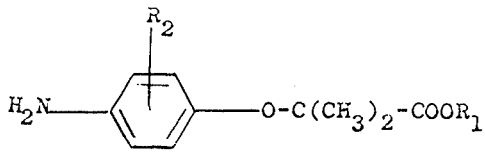

VII wherein $R_1$ and $R_2$ have the values given above.

Preferred compounds of Formula VI are those with identical Z groups, e.g., 1,4-dichloro-, 1,4-dibromo- and 1,4-diiodobutane; 1,5-dichloro-, 1,5-dibromo- and 1,5-diiodopentane; 1,4-dichloro-, 1,4-dibromo- and 1,4-diiodo-2-butanol; 1,5-dichloro-, 1,5-dibromo- and 1,5-diiodo-2-pentanol; o-xylylene chloride, bromide and iodide, o-phthalyl alcohol (o-hydroxymethylbenzyl alcohol) and the reactive esters thereof, e.g., the bis-(methanesulfonate) and bis-(p-toluenesulfonate); o-xylenediamine; phthalan (isocoumaran); isoindoline; and the derivatives of the aryl compounds substituted as indicated above in the aromatic ring, e.g., 5-methyl-1-xylene bromide, 5,6-dimethoxy-1,2-xylene bromide and 5,6-methylenedioxy-1,2-xylene bromide.

Suitable solvents for the cyclization of IV are, for example, water; lower aliphatic alcohols, e.g., methanol, ethanol, isopropanol and n-butanol; glycols, e.g., ethylene glycol, ethers, e.g., diethyl and diisopropyl ether, tetrahydrofuran and dioxane; aliphatic hydrocarbons, e.g., petroleum ether and hexane; aromatic hydrocarbons, e.g., benzene, toluene and xylene; halogenated hydrocarbons, e.g., chloroform and chlorobenzene; nitriles, e.g., acetonitrile; amides, e.g., dimethylformamide and dimethylacetamide; sulfoxides, e.g., dimethyl sulfoxide and mixtures of these solvents. Normally, the cyclization is conducted at a temperature of between 0° and 300° C., preferably between room temperature and the boiling temperature of the solvent employed, which latter temperature can be optionally increased by the use of pressure, e.g., up to 200 atmospheres. The selection of the catalyst is dependent on the type of compound H Z to be split off. In case Z = halogen, basic catalysts are preferred, e.g., inorganic bases, including alkali metal or alkaline earth metal hydroxides, carbonates, and alcoholates, e.g., NaOH, KOH, LiOH, $Ba(OH)_2$, $CA(OH)_2$, $Na_2CO_3$, $K_2CO_3$, $Li_2CO_3$, $NaOCH_3$, $KOCH_3$, $NaOC_2H_5$, $KOC_2H_5$ and K-tert.-butylate and organic bases, e.g., tertiary bases, including triethylamine, pyridine, picolines, quinoline. In contrast thereto, when Z = OH, alkoxy, acyloxy, alkyl- or arylsulfonyloxy, acidic catalysts are advantageous, e.g., inorganic acids, including sulfuric acid, polyphosphoric acid, hydrobromic acid and hydrochloric acid; organic acids, including formic acid, acetic acid, propionic acid and p-toluenesulfonic acid which in excess can likewise serve as the solvent. Ordinarily, more vigorous conditions are required for the cyclization of these substances. Compounds of Formula IV (Z = $NH_2$) split off ammonia during heating, for example during melting, thus producing the desired compounds of Formula I.

A preferred mode of operation is to produce the compounds of Formula IV in the nascent state (for example, from VI and VII) in the presence or absence of an additional solvent and, rather than isolating these compounds, cyclize them directly to compounds of Formula I. A catalyst, e.g., a base, including NaOH, KOH, sodium carbonate and potassium carbonate, can be employed but is not absolutely necessary. It is also possible to utilize an excess of the amino compound VII in place of the base.

Especially advantageous is the reaction of compounds of Formula VI wherein both Z = Br with VII in a boiling alcohol and in the presence of potassium carbonate, to produce compounds of Formula IV (X = Br) as intermediates which are cyclized in situ. Under these conditions, the reaction is terminated after about 1–12 hours.

Optionally, unreacted primary amino compounds, (Formula VI) and/or secondary amino compounds (Formula IV) can be converted, prior to the further working-up procedure, into non-basic compounds by acylation, e.g., by treatment with acetic anhydride.

Compounds of Formula I can also be obtained by solvolysis, (preferably hydrolysis), thermolysis, esterification or interesterification of compounds of Formula V wherein W represents, in particular, one of the following residues: COOH; CHal$_3$; COHal; COOR$_5$; C(OR$_5$)$_3$; COOAcyl, wherein acyl is the acyl group of a carboxylic acid of up to 25 carbon atoms, preferably

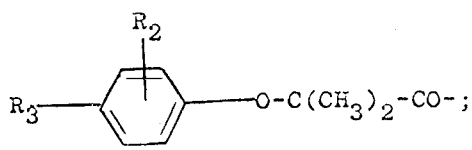

CN; CONH$_2$; CONHR$_5$; CONR$_5$R$_6$; CONHOH; C(OH)=NOH; CONHNH$_2$; CON$_3$; C(OR$_5$)=NH; C(NH$_2$)=NNH$_2$; C(NHNH$_2$)=NH; CSOH; COSH; CSOR$_5$; CSNH$_2$; CSNHR$_5$; or CSNR$_5$R$_6$, wherein R$_5$ and R$_6$, which can be identical or different, in each instance, are alkyl of 1-4 carbon atoms, preferably methyl or ethyl, or collectively tetramethylene or pentamethylene, optionally interrupted by O. Compounds of Formula V can be produced, for example, by reacting phenols of Formula Ii with isobutyric acid derivatives of the formula X—C(CH$_3$)$_2$—W.

Hydrolysis of compounds of Formula V wherein W is a functionally modified COOH-group can be conducted in an acidic or optionally alkaline medium at temperatures of between −20° C. and 300° C., preferably at the boiling temperature of the chosen solvent. Suitable acidic catalysts are, for example, hydrochloric, sulfuric, phosphoric and hydrobromic acid. Suitable basic catalysts include sodium, potassium and calcium hydroxide, and sodium and potassium carbonate. Preferred solvents are water; lower alcohols, e.g., methanol and ethanol; ethers, e.g., tetrahydrofuran and dioxane; amides, e.g., dimethylformamide; nitriles, e.g., acetonitrile; sulfones, e.g., tetramethylenesulfone; and mixtures thereof, particularly the mixtures containing water. However, it is also possible to saponify the acid derivatives to carboxylic acids of Formula I wherein R$_1$ is H, for example, in ether or benzene with the addition of strong bases, e.g., potassium carbonate, or without solvents by melting the compound with alkalis, e.g., KOH and/or NaOH or alkaline earths.

One embodiment of this invention relates to the saponification of thioamides (V; W = CSNR$_5$R$_6$), e.g., thiomorpholides, -piperidides, -pyrrolidides, -dimethylamides and -diethylamides. The amides (V; W = CONH$_2$) are also usable as the starting compounds. The thioamides and/or amides are preferably hydrolyzed by heating with aqueous hydrochloric acid. The starting thioamides and/or amides need not necessarily be isolated in this process. Instead, the reaction mixture in which they are formed can be subjected to the hydrolysis.

By the dry heating of, in particular, tertiary alkyl esters of Formula V wherein W is COO-tert.-alkyl to temperatures of between 50° and 350° C., acids of Formula I are obtained (R$_1$ = H). The thermolysis can also be effected in inert solvents, such as benzene, water, dimethylformamide, ethylene glycol, glycerin, dimethyl sulfoxide and cyclohexanol, preferably with the addition of a catalytic amount of an acid, e.g., p-toluenesulfonic acid.

An additional embodiment of this invention relates to the hydrolysis of nitriles of Formula V wherein W is CN. This process can be conducted in an acidic medium, e.g., with acetic acid/HCl, or in an alkaline medium, e.g., with KOH in cyclohexanol.

Esters of the Formula I wherein R$_1$ = alkyl of up to 10 carbon atoms can be prepared in accordance with methods described in the literature. Thus, it is possible, for example, to react an acid of Formula I (R$_1$ = H) with the respective alcohol of the formula R$_1$OH wherein R$_1$ represents alkyl of up to 10 carbon atoms, in the presence of an inorganic or organic acid, e.g., HCl, HBr, HI, H$_2$SO$_4$, H$_3$PO$_4$, trifluoroacetic acid, benzenesulfonic acid and p-toluenesulfonic acid, or in the presence of an acidic ion exchanger, optionally in the presence of an inert solvent, e.g., benzene, toluene and xylene, at temperatures of between 0° C. and preferably the boiling temperature of the reaction mixture. The alcohol is preferably utilized in excess. The reaction can be conducted in the presence of a water-binding agent, e.g., anhydrous heavy metal sulfates, including CuSO$_4$, Fe$_2$(SO$_4$)$_3$, NiSO$_4$, CoSO$_4$ and ZnSO$_4$, or in the presence of a molecular sieve. It is also possible to remove the water of reaction azeotropically advantageously by the addition of a hydrocarbon, e.g., benzene or toluene, or a chlorinated hydrocarbon, e.g., chloroform or 1,2-dichloroethane. The esterification takes place under gentle conditions if the water of reaction is chemically bound by the addition of preferably an equimolar amount of a carbodiimide, e.g., N,N'-dicyclohexyl carbodiimide. In this procedure, inert solvents can be used, e.g., ether, dioxane, benzene or 1,2-dimethoxyethane. A base, e.g., pyridine, can be added. The methyl or ethyl esters can also be produced by reacting the free acids in accordance with methods described in the literature with diazomethane and diazoethane, respectively, in an inert solvent, e.g., ether, benzene, or methanol. Esters of Formula I wherein R$_1$ is alkyl of up to 10 carbon atoms can also be obtained by chemically adding the carboxylic acids I (R$_1$ = H) to an olefin, e.g., isobutylene. This addition reaction is accomplished in accordance with methods disclosed in the literature, preferably in the presence of a catalyst, e.g., ZnCl$_2$, BF$_3$, H$_2$SO$_4$, arylsulfonic acids, pyrophosphoric acid, boric acid and oxalic acid, at temperatures of between 0° and 200° C., pressures of between 1 and 300 atmospheres, and in inert solvents, e.g., ether, tetrahydrofuran, dioxane, benzene, toluene and xylene.

Esters of Formula I wherein R$_1$ is alkyl of up to 10 carbon atoms can also be produced by reacting a metallic salt of free acid I (R$_1$ = H), preferably the alkali metal, lead or silver salt, with an alkyl halogenide corresponding to the respective alcohol, e.g., those of the formula R$_1$Hal, wherein R$_1$ is alkyl of up to 10 carbon atoms, optionally in an inert solvent, e.g., ether, benzene and petroleum ether, or with an alkyl chlorosulfite, e.g., those of the formula R$_1$OSOCl, wherein R$_1$ is alkyl of up to 10 carbon atoms and by thermolyzing the thus-obtained adducts.

It is also possible to convert the acid halogenides, anhydrides and nitriles of Formula V wherein W is CO-Hal, COOAcyl, or CN into esters of Formula I wherein R$_1$ is alkyl of 1–10 carbon atoms, in accordance with the methods described in the literature, by reaction with an alcohol of the formula R$_1$OH wherein R$_1$ is alkyl of up to 10 carbon atoms, if desired in the presence of an acidic catalyst or a base, e.g., NaOH, KOH, $Na_2CO_3$, $K_2CO_3$, pyridine, or an alkali metal alcoholate corresponding to the alcohol employed. Preferably, an excess of the respective alcohol is utilized, and the procedure is conducted at temperatures of between 0° C. and the boiling temperature of the reaction mixture.

Esters of Formula I wherein $R_1$ is alkyl of up to 10 carbon atoms can also be prepared by reacting other esters of Formula V wherein W is $COOR_7$, $R_7$ being any desired organic residue, preferably alkyl of 1-4 carbon atoms, with an excess of the respective alcohol, or by reacting the carboxylic acids I ($R_1 = H$) with another ester of the respective alcohol, preferably alkanoates wherein the alkanoyl group contains up to 4 carbon atoms, which are preferably employed in an excess. The reaction is conducted, for example, in accordance with the interesterification methods described in the literature, especially in the presence of a basic or acidic catalyst, e.g., sodium ethylate and sulfuric acid, at temperatures of between 0° C. and preferably the boiling temperature.

Esters of Formula I wherein $R_1$ is alkyl of 1-10 carbon atoms can be obtained by solvolyzing compounds of Formula V wherein W is a thioester, iminoether, oximinoether, hydrazone ether, thioamide, amidine, amidoxime or amide hydrazine group, with a dilute aqueous base or acid, e.g., ammonia, NaOH, KOH, $Na_2CO_3$, $K_2CO_3$, HCl and $H_2SO_4$, with the addition of the respective alcohol of the formula $R_1OH$ wherein $R_1$ is alkyl of up to 10 carbon atoms and splitting off hydrogen sulfide, ammonia, amines, hydrazine derivatives and hydroxylamine, respectively. Although most of the iminoether hydrochlorides are immediately disassociated in an aqueous solution into the esters and ammonium chlorides at room teperature, the solvolysis of other derivatives, e.g., some amidoximes or thioamides, requires temperatures of up to 100° C.

A compound of Formula I having a basic N-atom can be converted with acid into the corresponding acid addition salt. For this reaction preferred acids are those yielding physiologically acceptable salts. Examples of suitable salts are salts of organic and inorganic acids, e.g., aliphatic, alicyclic, araliphatic, aromatic and heterocyclic mono- and polybasic carboxylic and sulfonic acids, including formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicyclic acid, phenylpropionic acid, citric acid, gluconic acid, ascorbic acid, nicotinic acid, isonicotinic acid, methanesulfonic acid, ethanedisulfonic acid, 2-hydroxyethanesulfonic acid, p-toluenesulfonic acid, naphthalene-mono- and disulfonic acids, sulfuric acid, nitric acid and hydrohalic acids, e.g., hydrochloric acid and hydrobromic acid, and phosphoric acids, e.g., orthophosphoric acid. Other acids can be employed to produce other acid addition salts for isolation, identification or characterizing purposes.

Free acid compounds of Formula I ($R_1 = H$) can be converted into one of the physiologically acceptable metallic or ammonium salts thereof by reaction with a metal base or amine, respectively. Suitable salts are, for example, the sodium, potassium, magnesium, calcium, and ammonium salts, substituted ammonium salts, e.g., the dimethyl- and diethylammonium and other dialkylammonium, monoethanol-, diethanol-, and triethanolammonium, cyclohexylammonium, dicyclohexylammonium and dibenzylethylenediammonium salts.

Conversely, compounds of Formula I can be liberated from the acid addition salts thereof by treatment with a strong base, e.g., sodium or potassium hydroxide, sodium or potassium carbonate or a basic ion exchanger, or they can be liberated from the metallic and ammonium salts thereof by treatment with acids, especially mineral acids, such as hydrochloric acid or sulfuric acid.

When the compounds of Formula I contain a center of asymmetry, they are ordinarily present in racemic form. The racemates can be separated into the optical antipodes thereof by known methods, as disclosed in the literature, preferably employing chemical methods. In accordance therewith, diastereomers are formed, for example, from the racemic mixture by reaction with an optically active auxiliary agent. Thus, optionally, an optically active base can be reacted with the carboxyl group, or an optically active acid can be reacted with the amino group of a compound of Formula I. For example, diastereomeric salts of the compounds of Formula I ($R_1 = H$) can be formed with optically active amines, e.g., quinine, cinchonidine, brucine, cinchonine, hydroxy hydrindamine, morphine, l-phenylethylamine, l-naphthylethylamine, phenyloxynaphthylmethylamine, quinidine and strychnine, basic amino acids, e.g., lysine, arginine, amino acid esters, and diastereomeric salts of the compounds of Formula I with a basic N-atom can be formed with optically active acids, e.g., (+)- and (-)-tartaric acid, dibenzoyl-(+)-and -(−)-tartaric acid, diacetyl -(+)- and -(−) tartaric acid, camphoric acid, p-camphorsulfonic acid, (+)- and (−)-mandelic acid, (+)- and (−)-malic acid, (+)- and (−)-2-phenylbutyric acid, (+)- and (−)-dinitrodiphenic acid and (+)- and (−)-lactic acid. In a similar manner, ester diastereomers can be produced by esterification of the compounds of Formula I ($R_1 = H$) with optically active alcohols, e.g., borneol, menthol and 2-octanol. The difference in the solubility of the thus-obtained diastereomeric salts and/or esters makes it possible to conduct the selective crystallization of one of the forms and the regeneration of the respective optically active compounds from the mixture.

The racemates can also be separated by chromatographic methods. It is possible to employ optically active substrate materials, e.g., tartaric acid, amylose, cane sugar, cellulose and acetylated cellulose and optically inactive and/or optically active mobile phases for the separation into the pure enantiomers. Also, an optically inactive substrate material, e.g., silica gel or aluminum oxide can be used in combination with an optically active mobile phase. The optical antipodes can also be separated biochemically employing selective ensymatic reactions. Thus, the racemic acids of Formula I ($R_1 = H$) can be exposed to an asymmetrical oxidase or optionally decarboxylase, which destroys one form by oxidation or decarboxylation, leaving the other form unaltered. A hydrolase can also be used in case of a functional acid derivative of the racemic mixture for the preferred formation of one optically active form. Thus, esters of Formula I wherein $R_1$ is alkyl of 1–10 carbon atoms can be subjected to the effect of a hydrolase which selectively saponifies one of the enantiomers and leaves the other unchanged.

It is, of course, possible to obtain optically active compounds in accordance with the described methods for producing the racemic forms by employing starting substances which are already optically active.

The novel compounds of Formula I and the physiologically acceptable acid addition salts thereof can be employed in human or veterinary medicine in a mixture with conventional solid, liquid or semiliquid excipients. Useful pharmaceutically acceptable carrier substances are those organic or inorganic materials which are suitable for parenteral, enteral, or topical application and which do not react adversely with the novel compounds, such as, for example, water, vegetable oils, benzyl alcohols, polyethylene glycols, gelatin, lactose, starch, magnesium stearate, talc, petroleum jelly, cholesterol, etc. For parenteral application, especially suitable are solutions, preferably oily or aqueous solutions, as well as suspensions, emulsions, or implants. For enteral application, there can also be employed tablets, dragees, capsules, syrups, elixirs or suppositories. For topical application, ointments, salves, creams, powders and liquid and solid aerosols can be employed. The aforementioned preparations can optionally be sterilized or mixed with auxiliary agents, e.g., preservatives, stabilizers and wetting agents, salts for influencing osmotic pressure, buffers, coloring agents, flavoring agents and/or aromatic substances.

The compounds of this invention are preferably administered in a dosage of 10–1000 mg. per dosage unit.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1 a. 17.7 g. of 4-pyrrolidinophenol (1-p-hydroxyphenylpyrrolidine; obtainable by reacting p-anisidine with 1,4-dibromobutane and subsequent treatment of the thus-obtained 4-pyrrolidinoanisole with HBr) is refluxed with 2.3 g. of sodium and 19.5 g. of ethyl 2-bromoisobutyrate in 100 ml. of absolute ethanol for 3 hours. The reaction mixture is concentrated by evaporation; the residue is mixed with water, and the aqueous solution is extracted with ether. The ether solution is washed twice with dilute NaOH and twice with water and then dried. The ether is removed by evaporation, thus obtaining the ethyl ester of 2-methyl-2-(4-pyrrolidinophenoxy)-propionic acid, b.p. 165°–170°/0.05 mm.

In place of ethyl 2-bromoisobutyrate, it is also possible to utilize ethyl 2-chloroisobutyrate or ethyl 2-iodoisobutyrate.

Analogously, using the following starting compounds:

4-piperidino-phenol
2-methyl-4-piperidino-phenol (m.p. 231°–233°; obtainable by the catalytic hydrogenation of 2-chloromethyl-4-nitroanisole to 2-methyl-4-aminoanisole, ether splitting with 48% HBr, and reaction with 1,5-dibromopentane)
2-chloro-4-piperidino-phenol (m.p. 90°–92°; obtainable by reacting 2-chloro-4-aminoanisole with 1,5-dibromopentane to 2-chloro-4-piperidinoanisole [m.p. 68°–69°] and ether splitting with HBr)
3-chloro-4-piperidino-phenol (m.p. 89°; obtainable by reacting 3-nitro-4-bromoanisole with piperidine to 3-nitro-4-piperidinoanisole, hydrogenation to 3-amino-4-piperidinoanisole, diazotization and Sandmeyer reaction to 3-chloro-4-piperidinoanisole and ether splitting with HBr)
4-(3-hydroxypyrrolidino)-phenol (m.p. 163°–164°; obtainable by reacting p-anisidine with 1,4-dibromo-2-butanol to 4-(3-hydroxypyrrolidino)-anisole [m.p. 73°–74°] and ether splitting with HBr)
4-(3-hydroxypiperidino)-phenol (m.p. 140°–143°; obtainable by hydrogenation of 3-chloro-4-(3-hydroxypiperidino)-anisole on 5% Pd/MgO to 4-(3-hydroxypiperidino)-anisole [m.p. 170°–172°] and ether splitting with HBr)
3-chloro-4-(3-hydroxypiperidino)-phenol (obtainable by reacting 3-nitro-4-bromoanisole with 3-hydroxypiperidine to 3-nitro-4-(3-hydroxypiperidino)-anisole, hydrogenation on 5% Pd/C to 3-amino-4-(3-hydroxypiperidino)-anisole [m.p. 122°–123°], diazotization and Sandmeyer reaction to 3-chloro-4-(3-hydroxypiperidino)-anisole [m.p. 70°–72°], and ether splitting with HBr)
4-isoindolino-phenol (m.p. 215°; obtainable by reacting p-anisidine with o-xylylene dibromide to 2-p-methoxyphenyl isoindoline and ether splitting with HBr)
4-(5,6-dimethoxy-isoindolino)-phenol (obtainable by reacting 4,5-dimethoxy-1,2-xylylene dichloride [m.p. 83°] with p-aminophenyl acetate and subsequent alkaline saponification)
4-(5,6-methylenedioxy-isoindolino)-phenol (obtainable by reacting 4,5-methylenedioxy-1,2-xylylene dibromide [m.p. 96°] with p-aminophenyl acetate and subsequent alkaline saponification)
4-(1,2,3,4-tetrahydroquinolino)-phenol (m.p. 106°–108°; obtainable by reacting N-p-methoxyphenylanthranilic acid with acetic anhydride and subsequent saponification to 1-p-methoxyphenyl-4-hydroxy-2-quinolone, reaction with POCl₃ to 1-p-methoxyphenyl-4-chloro-2-quinolone [m.p. 192°–194°], hydrogenation to 1-p-methoxyphenyl-3,4-dihydro-2-quinolone [m.p. 161–162°], LiAlH₄ reduction to 1-p-methoxyphenyl-1,2,3,4-tetrahydroquinoline, and ether splitting with HBr)
4-(1,2,3,4-tetrahydro-4-quinolyl)-phenol (m.p. 123°–125°; hydrochloride, m.p. 217°–220°; obtainable by cyclization of p-methoxycinnamic acid anilide with polyphosphoric acid to 4-(p-methoxyphenyl)-1,2,3,4-tetrahydro-2-quinolone, reduction with LiAlH₄ to 4-(p-methoxyphenyl)-1,2,3,4-tetrahydroquinoline [m.p. 83°–85°], and ether splitting with HBr)
4-(1-methyl-1,2,3,4-tetrahydro-4-quinolyl)-phenol (m.p. 220°–222°; obtainable by methylating 4-(p-methoxyphenyl)-1,2,3,4-tetrahydroquinoline with formaldehyde/H₂/5% Pd/C to 1-methyl-4-p-methoxyphenyl-1,2,3,4-tetrahydroquinoline [b.p. 164–172°/0.01 mm.], and ether splitting with HBr)
4-(2-methyl-1-benzimidazolyl)-phenol (m.p. 227°–229°; obtainable by treatment of 1-(p-methoxyphenyl)-2-methyl-benzimidazole [m.p. 106°–108°] with HBr)

4-(1-pyrryl)-phenol (m.p. 118°–119°; obtainable by reacting p-aminophenol with 2,5-diethoxytetrahydrofuran)

4-(1-benzotriazolyl)-phenol (m.p. 173°–175°; obtainable by ether splitting of 1-(4-methoxyphenyl)-benzotriazole [m.p. 91°–93°] with HBr)

4-(2-indanyl)-phenol (m.p. 75°–77°; obtainable by reacting 4-methoxyphenylacetic acid ethyl ester with benzyl chloride to the ethyl ester of α-benzyl-p-methoxyphenylacetic acid [b.p. 142°–145°/0.01 mm.], saponification to the acid [m.p. 101°–103°], converting the acid with $SOCl_2$ into the chloride [m.p. 61–62°], cyclization to 2-p-methoxyphenyl-1-indanone [m.p. 75°–78°], $NaBH_4$ reduction to 2-p-methoxyphenyl-1-indanol, dehydration with p-toluenesulfonic acid in benzene to 2-p-methoxyphenyl-indene, catalytic hydrogenation to 2-p-methoxyphenyl-indane, and ether splitting with HBr)

4-(4-piperidinophenyl)-phenol (m.p. 193°–195°; obtainable by reacting 4-amino-4'-methoxy-biphenyl with 1,5-dibromopentane to 4-piperidino-4'-methoxy-biphenyl [m.p. 190°–192°], and ether splitting with HBr).

the following compounds are obtained by reaction with ethyl 2-bromoisobutyrate (reaction times are set forth in parentheses) or with ethyl 2-chloroisobutyrate or ethyl 2-iodoisobutyrate, respectively:

ethyl ester of 2-methyl-2-(4-piperidinophenoxy)-propionic acid (3 hours), b.p. 158°/0.2 mm.;

ethyl ester of 2-methyl-2-(2-methyl-4-piperidinophenoxy)-propionic acid (3 hours), b.p. 161°–167°/0.05 mm.; hydrochloride, m.p. 185°–187°;

ethyl ester of 2-methyl-2-(2-chloro-4-piperidinophenoxy)-propionic acid (2 hours), b.p. 171°–175°/0.01 mm.;

ethyl ester of 2-methyl-2-(3-chloro-4-piperidinophenoxy)-propionic acid (2.5 hours), b.p. 138°/0.05 mm.;

ethyl ester of 2-methyl-2-[4-(3-hydroxypyrrolidino)-phenoxy]-propionic acid (6 hours), b.p. 156°–157°/0.01 mm.;

ethyl ester of 2-methyl-2-[4-(3-hydroxypiperidino)-phenoxy]-propionic acid (15 hours), b.p. 200–206°/0.05 mm.;

ethyl ester of 2-methyl-2-[3-chloro-4-(3-hydroxypiperidino)-phenoxy]-propionic acid (15 hours), oily;

ethyl ester of 2-methyl-2-(4-isoindolinophenoxy)-propionic acid (5 hours), m.p. 70°–71°;

ethyl ester of 2-methyl-2-[4-(5,6-dimethoxy-isoindolino)-phenoxy]-propionic acid (5 hours), m.p. 139°–141°;

ethyl ester of 2-methyl-2-[4-(5,6-methylenedioxy-isoindolino)-phenoxy]-propionic acid (5 hours), m.p. 137°–138°;

ethyl ester of 2-methyl-2-[4-(1,2,3,4-tetrahydroquinolino)-phenoxy]-propionic acid (3 hours), b.p. 178°/0.01 mm.;

ethyl ester of 2-methyl-2-[4-(1,2,3,4-tetrahydro-4-quinolyl)-phenoxy]-propionic acid (48 hours), m.p. 64°–66°;

ethyl ester of 2-methyl-2-[4-(1-methyl-1,2,3,4-tetrahydro-4-quinolyl)-phenoxy]-propionic acid (20 hours), b.p. 191°–197°/0.05 mm.;

ethyl ester of 2-methyl-2-[4-(2-methyl-1-benzimidazolyl)-phenoxy]-propionic acid (15 hours), m.p. 93°–94°;

ethyl ester of 2-methyl-2-[4-(1-pyrryl)-phenoxy]-propionic acid (15 hours), m.p. 43–44°;

ethyl ester of 2-methyl-2-[4-(1-benzotriazolyl)-phenoxy]-propionic acid (15 hours), oily;

ethyl ester of 2-methyl-2-[4-(2-indanyl)-phenoxy]-propionic acid (12 hours), b.p. 162°–164°/0.01 mm.;

ethyl ester of 2-methyl-2-[4-(4-piperidinophenyl)-phenoxy]-propionic acid, m.p. 100°–102°.

b. 13.5 g. of the ethyl ester of 2-methyl-2-(4-pyrrolidinophenoxy)-propionic acid is refluxed with 6.25 g. of KOH in 80 ml. of ethanol for 2 ½ hours. The mixture is then concentrated by evaporation, mixed with water, extracted with ether, and hydrochloric acid is added thereto, up to a pH of 5. The thus-obtained 2-methyl-2-(4-pyrrolidinophenoxy-propionic acid is filtered and recrystallized from ethanol; m.p. 105°–107°.

Analogously, the following compounds are produced by saponification of the corresponding ethyl esters (acidification to the indicated pH values):

2-methyl-2-(4-piperidinophenoxy)-propionic acid (pH 5), m.p. 202°–204°;

2-methyl-2-(2-methyl-4-piperidinophenoxy)-propionic acid (pH 5), m.p. 178°–179°;

2-methyl-2-(2-chloro-4-piperidinophenoxy)-propionic acid (pH 5), m.p. 162°–163°;

2-methyl-2-(3-chloro-4-piperidinophenoxy)-propionic acid (pH 5), m.p. 97°–98°;

2-methyl-2-[4-(3-hydroxypyrrolidino)-phenoxy]-propionic acid (pH 4.5), m.p. 130°–131°;

2-methyl-2-[4-(3-hydroxypiperidino)-phenoxy]-propionic acid (pH 4.5), m.p. 158°–160°;

2-methyl-2-[3-chloro-4-(3-hydroxypiperidino)-phenoxy]-propionic acid (pH 4), m.p. 115°–117°;

2-methyl-2-(4-isoindolinophenoxy)-propionic acid (during the saponification, the K-salt precipitates, which is filtered off and decomposed with hydrochloric acid), m.p. 202°;

2-methyl-2-[4-(5,6-dimethoxy-isoindolino)-phenoxy]-propionic acid;

2-methyl-2-[4-(5,6-methylenedioxy-isoindolino)-phenoxy]-propionic acid;

2-methyl-2-[4-(1,2,3,4-tetrahydroquinolino)-phenoxy]-propionic acid (pH 4), m.p. 115°–117°;

2-methyl-2-[4-(1,2,3,4-tetrahydro-4-quinolyl)-phenoxy]-propionic acid (pH 5.5), cyclohexylamine salt, m.p. 221°–224°;

2-methyl-2-4-(1-methyl-1,2,3,4-tetrahydro-4-quinolyl)-phenoxy]-propionic acid (pH 4), cyclohexylamine salt, m.p. 221°–223°;

2-methyl-2-[4-(2-methyl-1-benzimidazolyl)-phenoxy]-propionic acid (pH 5), m.p. 125°–127°;

2-methyl-2-[4-(1-pyrryl)-phenoxy]-propionic acid (pH 4), m.p. 159°–161°;

2-methyl-2-[4-(1-benzotriazolyl)-phenoxy]-propionic acid (pH 5), m.p. 73°–75°;

2-methyl-2-[4-(2-indanyl)-phenoxy]-propionic acid (pH 3), m.p. 125°–127°;

2-methyl-2-[4-(4-piperidinophenyl)-phenoxy]-propionic acid (pH 5), m.p. 222°–224°.

EXAMPLE 2

13 g. of 4-(1,2,3,4-tetrahydroquinolino)-phenol is added to a suspension of 1.45 g. of NaH in 100 ml. of dimethylacetamide. The reaction mixture is agitated for one hour at room temperature, and then 11.8 g. of ethyl α-bromoisobutyrate is added thereto and the mixture maintained at 90° for 20 hours. Thereafter, the reaction mixture is cooled, mixed with water, and extracted with ether. The ether solution is washed twice with 2N NaOH and concentrated to dryness by evaporation after drying, thus obtaining the ethyl ester of 2-methyl-2-[4-(1,2,3,4-tetrahydroquinolino)-phenoxy]-propionic acid, b.p. 178°0.01 mm.

EXAMPLE 3

A mixture of 4.5 g. of 4-(1,2,3,4-tetrahydroquinolino)-phenol and 0.46 g. of sodium in 100 ml. of xylene is refluxed for 3 hours and then allowed to cool to 20°. To this reaction mixture is added 4.2 g. of ethyl 2-bromoisobutyrate in 10 ml. of xylene, the suspension agitated under boiling for 6 hours, cooled, and treated with 2 ml. of ethanol. The inorganic precipitate is filtered off, the filtrate is evaporated, the residue taken up in ether, the solution washed with NaHCO$_3$ solution and saturated NaCl solution, dried over MgSO$_4$, and concentrated by evaporation. The product thus obtained is the ethyl ester of 2-methyl-2-[4-(1,2,3,4-tetrahydroquinolino)-phenoxy]-propionic acid, b.p. 178°/0.01 mm.

Analogously, by reaction with the following compounds:
methyl ester of 2-bromoisobutyric acid
n-propyl ester of 2-bromoisobutyric acid
isopropyl ester of 2-bromoisobutyric acid
n-butyl ester of 2-bromoisobutyric acid
isobutyl ester of 2-bromoisobutyric acid
sec.-butyl ester of 2-bromoisobutyric acid
tert.-butyl ester of 2-bromoisobutyric acid
isoamyl ester of 2-bromoisobutyric acid
n-hexyl ester of 2-bromoisobutyric acid
(2-ethylhexyl) ester of 2-bromoisobutyric acid
n-decyl ester of 2-bromoisobutyric acid,
the corresponding esters of the acids set forth in Example 1(b) are obtained from the phenols disclosed in Example 1, for example the methyl ester of 2-methyl-2-[4-(1,2,3,4-tetrahydroquinolino)-phenoxy]-propionic acid, m.p. 64°–65°, or the
n-propyl ester (b.p. 190°–200°/0.01 mm.),
isopropyl ester,
n-butyl ester,
isobutyl ester,
sec.-butyl ester,
tert.-butyl ester,
isoamyl ester,
n-hexyl ester,
(2-ethylhexyl) ester, or
n-decyl ester thereof.

EXAMPLE 4

A solution of 19.5 g. of the ethyl ester of 2-bromoisobutyric acid in 30 ml. of acetone is gradually added to an agitated mixture of 22.5 g. of 4-(1,2,3,4-tetrahydroquinolino)-phenol, 13.8 g. of K$_2$CO$_3$, and 80 ml. of acetone. The mixture is refluxed under stirring for 12 hours, filtered, evaporated, distilled, and the product thus obtained is the ethyl ester of 2-methyl-2-[4-(1,2,3,4-tetrahydroquinolino)-phenoxy]-propionic acid, b.p. 178°/0.01 mm.

EXAMPLE 5

15 g. of sulfuric acid is added to a mixture of 12 g. of 4-(1,2,3,4-tetrahydroquinolino)-phenol and 15 g. of ethyl 2-hydroxybutyrate, and the reaction mixture is agitated for 2 hours at 50°–60°. After cooling, the mixture is mixed with water; dilute NaOH is added up to a pH of 8, and the aqueous phase is extracted with ether. The mixture is dried, concentrated by evaporation, and the ethyl ester of 2-methyl-2-[4-(1,2,3,4-tetrahydroquinolino)-phenoxy]-propionic acid is thus obtained, b.p. 178°/0.01 mm.

EXAMPLE 6 a. 22.5 g. of 4-(1,2,3,4tetrahydroquinolino)-phenol is dissolved in 200 ml. of acetone. Under agitation, 4 g. of NaOH is added thereto, and then, under stirring and refluxing, 16.7 g. of 2-bromoisobutyric acid (or 12.25 g. of 2-chloroisobutyric acid) in 60 ml. of acetone is added dropwise thereto; the mixture is stirred for another hour at 56° and allowed to stand for 24 hours. The acetone is distilled off, the residue dissolved in 1 l. of water, the solution washed several times with ether, and acidified to a pH of 4 with HCl. The thus-precipitated 2-methyl-2-[4-(1,2,3,4-tetrahydroquinolino)-phenoxy]-propionic acid is filtered and recrystallized from ethanol or from diisopropyl ether/petroleum ether, m.p. 115°–117°.

Analogously, the acids set forth in Example 1(b) are obtained from the phenols disclosed in Example 1(a).

b. One gram of 2-methyl-2-[4-(1,2,3,4-tetrahydroquinolino)-phenoxy]-propionic acid is dissolved in 20 ml. of ether and mixed dropwise with ethereal CH$_2$N$_2$ solution until the yellow coloring thus obtained is permanent. After concentrating by evaporation, the methyl ester of 2-methyl-[4-(1,2,3,4-tetrahydroquinolino)-phenoxy]-propionic acid is obtained, m.p. 64°–65°; b.p. 195°/0.15 mm.

c. 5 g. of 2-methyl-2-[4-(1,2,3,4-tetrahydroquinolino)-phenoxy]-propionic acid is dissolved in 200 ml. of saturated ethanolic hydrochloric acid; the mixture is allowed to stand for 12 hours at room temperature, is then refluxed for 2 hours, and concentrated by evaporation. The residue is dissolved in water, the aqueous solution adjusted to a pH of 8 with 1N NaOH, and extracted with ethyl acetate. The mixture is dried, concentrated by evaporation, and the ethyl ester of 2-methyl-2-[4-(1,2,3,4-tetrahydroquinolino)-phenoxy]-propionic acid is thus produced, b.p. 178°/0.01 mm.

Analogously, the corresponding ethyl esters listed in Example 1(a) are obtained from the acids set forth in Example 1(b) with ethanolic hydrochloric acid.

EXAMPLE 7

23 g. of 1,4-dibromo-2-butanol, 22 g. of the ethyl ester of 2-methyl-2-(4-aminophenoxy)-propionic acid, and 27 g. of K$_2$CO$_3$ are refluxed in 400 ml. of n-butanol for 12 hours. Thereafter, the solvent is distilled off, the residue mixed with water, and extracted with ethyl acetate. The extract is dried and evaporated, thus obtaining the ethyl ester of 2-methyl-2-[4-(3-hydroxypyrrolidino)-phenoxy]-propionic acid, b.p. 156°–157°/0.01 mm.

Analogously, by reaction of the following compounds:

methyl ester of 2-methyl-2-(4-aminophenoxy)-propionic acid (obtainable by alkylation of Na-4-nitrophenolate with methyl 2-bromoisobutyrate to the methyl ester of 2-methyl-2-(4-nitrophenoxy)-propionic acid and subsequent hydrogenation), methyl ester of 2-methyl-2-(2-methyl-4-aminophenoxy)-propionic acid, methyl ester of 2-methyl-2-(2-chloro-4-aminophenoxy)-propionic acid, methyl ester of 2-methyl-2-(3-chloro-4-aminophenoxy)-propionic acid, the following compounds are produced with 1,4-dibromobutane, 1,5-dibromopentane, 1,4-dibromo-2-butanol, 1,5-dibromo-2-pentanol, o-xylylene bromide, 3,4-dimethoxy-1,2-xylylene bromide or 3,4-methylenedioxy-1,2-xylylene bromide, respectively:

methyl ester of 2-methyl-2-(4-pyrrolidinophenoxy)-propionic acid methyl ester of 2-methyl-2-(4-piperidinophenoxy)-propionic acid methyl ester of 2-methyl-2-(2-methyl-4-piperidinophenoxy)-propionic acid methyl ester of 2-methyl-2-(2-chloro-4-piperidinophenoxy)-propionic acid methyl ester of 2-methyl-2-(3-chloro-4-piperidinophenoxy)-propionic acid methyl ester of 2-methyl-2-[4-(3-hydroxypyrrolidino)-phenoxy]-propionic acid methyl ester of 2-methyl-2-[4-(3-hydroxypiperidino)-phenoxy]-propionic acid methyl ester of 2-methyl-2-[3-chloro-4-(3-hydroxypiperidino)-phenoxy]-propionic acid methyl ester of 2-methyl-2-(4-isoindolinophenoxy)-propionic acid methyl ester of 2-methyl-2-[4-(5,6-dimethoxy-isoindolino)-phenoxy]-propionic acid methyl ester of 2-methyl-2-[4-(5,6-methylenedioxy-isoindolino)-phenoxy]-propionic acid.

EXAMPLE 8

A mixture of 25.1 g. of the isobutyl ester of 2-methyl-2-(4-aminophenoxy)-propionic acid, 21.6 g. of 1,4-dibromobutane, 14 g. of $Na_2CO_3$, and 100 ml. of acetonitrile is refluxed under agitation for 48 hours. The mixture is then filterd, concentrated by evaporation, the residue taken up in dilute hydrochloric acid, washed with ether, rendered alkaline with dilute solution of sodium hydroxide, extracted with ether, dried, evaporated, and the compound thus obtained is the isobutyl ester of 2-methyl-2-(4-pyrrolidinophenoxy)-propionic acid, b.p. 180°–190°/0.02 mm.

EXAMPLE 9

17 g. of the ethyl ester of 2-methyl-2-(4-aminophenoxy)-propionic acid is refluxed in 170 ml. of n-butanol together with 32.4 g. of 1,4-dibromobutane and 11 g. of pulverized $K_2CO_3$ for 15 hours. The mixture is then cooled, filtered, the butanol is distilled off, the residue dissolved in 150 ml. of benzene, and the solution boiled for 2 hours with 10 ml. of acetic anhydride. The reaction mixture is cooled, washed with 1N NaOH, and extracted with 20% strength HCl. The aqueous hydrochloric acid solution is made alkaline, extracted with ether, the ether phase washed neutral with water, dried, and evaporated, thus obtaining the ethyl ester of 2-methyl-2-(4-pyrrolidinophenoxy)-propionic acid, b.p. 165°–170°/0.05 mm.

EXAMPLE 10

At 40°–50°, 12 g. of chloroform is added dropwise to a mixture of 9 g. of 4-(1,2,3,4-tetrahydroquinolino)-phenol, 30 g. of acetone, and 8.4 g. of pulverized KOH. The mixture is refluxed for 12 hours, evaporated, the residue mixed with water, extracted with ether, acidified with dilute hydrochloric acid to a pH of 5, and extracted with ether. The ether solution is extracted with dilute solution of sodium carbonate, the latter washed with ether, then again acidified, and again extracted with ether. The ether extracts are dried with sodium sulfate and concentrated by evaporation, thus obtaining 2-methyl-2-[4-(1,2,3,4-tetrahydroquinolino)-phenoxy]-propionic acid, m.p. 115°–117°.

Analogously, with acetone/chloroform/KOH, the acids set forth in Example 1(b) are obtained from the phenols listed in Example 1(a).

In an analogous manner, using the following starting compounds:

3-methyl-4-(1,2,3,4-tetrahydroquinolino)-phenol
3-ethyl-4-(1,2,3,4-tetrahydroquinolino)-phenol
3-n-butyl-4-(1,2,3,4-tetrahydroquinolino)-phenol
3-fluoro-4-(1,2,3,4-tetrahydroquinolino)-phenol
3-chloro-4-(1,2,3,4-tetrahydroquinolino)-phenol
3-bromo-4-(1,2,3,4-tetrahydroquinolino)-phenol
3-iodo-4-(1,2,3,4-tetrahydroquinolino)-phenol
4-(5-methyl-isoindolino)-phenol
4-(5-n-butyl-isoindolino)-phenol
4-(5-methoxy-isoindolino)-phenol
4-(5-n-butoxy-isoindolino)-phenol
4-(5-fluoro-isoindolino)-phenol
4-(5-chloro-isoindolino)-phenol
4-(5-bromo-isoindolino)-phenol
4-(5-iodo-isoindolino)-phenol
4-(4,7-dimethoxy-isoindolino)-phenol the following compounds are produced with acetone/chloroform/KOH:

2-methyl-2-[3-methyl-4-(1,2,3,4-tetrahydroquinolino)-phenoxy]-propionic acid 2-methyl-2-[3-ethyl-4-(1,2,3,4-tetrahydroquinolino)-phenoxy]-propionic acid 2-methyl-2-[3-n-butyl-4-(1,2,3,4-tetrahydroquinolino)-phenoxy]-propionic acid 2-methyl-2-[3-fluoro-4-(1,2,3,4-tetrahydroquinolino)-phenoxy]-propionic acid 2-methyl-2-[3-chloro-4-(1,2,3,4-tetrahydroquinolino)-phenoxy]-propionic acid 2-methyl-2-[3-bromo-4-(1,2,3,4-tetrahydroquinolino)-phenoxy]-propionic acid 2-methyl-2-[3-iodo-4-(1,2,3,4-tetrahydroquinolino)-phenoxy]-propionic acid 2-methyl-2-[4-(5-methyl-isoindolino)-phenoxy]-propionic acid 2-methyl-2-[4-(5-n-butyl-isoindolino)-phenoxy]-propionic acid 2-methyl-2-[4-(5-methoxy-isoindolino)-phenoxy]-propionic acid 2-methyl-2-[4-(5-n-butoxy-isoindolino)-phenoxy]-propionic acid 2-methyl-2-[4-(5-fluoro-isoindolino)-phenoxy]-propionic acid 2-methyl-2-[4-(5-chloro-isoindolino)-phenoxy]-propionic acid
2-methyl-2-[4-(5-bromo-isoindolino)-phenoxy]-propionic acid
2-methyl-2-[4-(5-iodo-isoindolino)-phenoxy]-propionic acid
2-methyl-2-[4-(4,7-dimethoxy-isoindolino)-phenoxy]-propionic acid.

EXAMPLE 11

2 g. of 2-methyl-2-(4-pyrrolidinophenoxy)-propionitrile (obtainable from 4-pyrrolidino-phenol and 2-bromoisobutyronitrile) is refluxed with 2 g. of KOH in 20 ml. of ethanol and 2 ml. of water for 40 hours. The mixture is then concentrated by evaporation, mixed with water, extracted with ether, and hydrochloric acid is added thereto, up to a pH of 5, thus obtaining 2-methyl-2-(4-pyrrolidinophenoxy)-propionic acid, m.p. 105°–107°.

Analogously, the corresponding carboxylic acids are produced by alkaline hydrolysis of the following compounds:

2-methyl-2-(4-piperidinophenoxy)-propionitrile
2-methyl-2-(2-methyl-4-piperidinophenoxy)-propionitrile
2-methyl-2-(2-chloro-4-piperidinophenoxy)-propionitrile
2-methyl-2-(3-chloro-4-piperidinophenoxy)-propionitrile
2-methyl-2-[4-(3-hydroxypyrrolidino)-phenoxy]-propionitrile
2-methyl-2-[4-(3-hydroxypiperidino)-phenoxy]-propionitrile
2-methyl-2-[3-chloro-4-(3-hydroxypiperidino)-phenoxy]-propionitrile
2-methyl-2-(4-isoindolinophenoxy)-propionitrile
2-methyl-2-[4-(5,6-dimethoxy-isoindolino)-phenoxy]-propionitrile
2-methyl-2-[4-(5,6-methylenedioxy-isoindolino)-phenoxy]-propionitrile
2-methyl-2-[4-(1,2,3,4-tetrahydroquinolino)-phenoxy]-propionitrile
2-methyl-2-[4-(1,2,3,4-tetrahydro-4-quinolyl)-phenoxy]-propionitrile
2-methyl-2-[4-(1-methyl-1,2,3,4-tetrahydro-4-quinolyl)-phenoxy]-propionitrile
2-methyl-2-[4-(2-methyl-1-benzimidazolyl)-phenoxy]-propionitrile
2-methyl-2-[4-(1-pyrryl)-phenoxy]-propionitrile
2-methyl-2-[4-(1-benzotriazolyl)-phenoxy]-propionitrile
2-methyl-2-[4-(2-indanyl)-phenoxy]-propionitrile
2-methyl-2-[4-(4-piperidinophenyl)-phenoxy]-propionitrile.

EXAMPLE 12

14 g. of 2-methyl-2-(4-pyrrolidinophenoxy)-propionitrile is refluxed with 60 ml. of acetic acid and 60 ml. of concentrated hydrochloric acid for 2 hours under a nitrogen atmosphere. The mixture is evaporated, dissolved in dilute NaOH, extracted with ether, and hydrochloric acid is added to a pH of 5, thus obtaining 2-methyl-2-(4-pyrrolidinophenoxy)-propionic acid, m.p. 105°–107°.

Analogously, the corresponding carboxylic acids are produced by an acidic hydrolysis of the nitriles set forth in Example 11.

EXAMPLE 13

3 g. of 2-methyl-2-(4-pyrrolidinophenoxy)-propionic acid amide (obtainable from 4-pyrrolidinophenol and 2-bromoisobutyamide) and 5 g. of KOH are refluxed in 100 ml. of ethanol under a nitrogen atmosphere for 3 hours. The mixture is then concentrated by evaporation, mixed with water, extracted with ether, and hydrochloric acid is added thereto, up to a pH of 4, thus producing 2-methyl-2-(4-pyrrolidinophenoxy)-propionic acid, m.p. 105°–107°.

Analogously, the corresponding carboxylic acids are obtained by alkaline hydrolysis of the following compounds:

2-methyl-2-(4-piperidinophenoxy)-propionic acid amide
2-methyl-2-(2-methyl-4-piperidinophenoxy)-propionic acid amide
2-methyl-2-(2-chloro-4-piperidinophenoxy)-propionic acid amide
2-methyl-2-(3-chloro-4-piperidinophenoxy)-propionic acid amide
2-methyl-2-[4-(3-hydroxypyrrolidino)-phenoxy]-propionic acid amide
2-methyl-2-[4-(3-hydroxypiperidino)-phenoxy]-propionic acid amide
2-methyl-2-[3-chloro-4-(3-hydroxypiperidino)-phenoxy]-propionic acid amide
2-methyl-2-(4-isoindolinophenoxy)-propionic acid amide
2-methyl-2-[4-(5,6-dimethoxy-isoindolino)-phenoxy]-propionic acid amide
2-methyl-2-[4-(5,6-methylenedioxy-isoindolino)-phenoxy]-propionic acid amide
2-methyl-2-[4-(1,2,3,4-tetrahydroquinolino)-phenoxy]-propionic acid amide
2-methyl-2-[4-(1,2,3,4-tetrahydro-4-quinolyl)-phenoxy]-propionic acid amide
2-methyl-2-[4-(1-methyl-1,2,3,4-tetrahydro-4-quinolyl)-phenoxy]-propionic acid amide
2-methyl-2-[4-(2-methyl-1-benzimidazolyl)-phenoxy]-propionic acid amide
2-methyl-2-[4-(1-pyrryl)-phenoxy]-propionic acid amide
2-methyl-2-[4-(1-benzotriazolyl)-phenoxy]-propionic acid amide
2-methyl-2-[4-(2-indanyl)-phenoxy]-propionic acid amide
2-methyl-2-[4-(4-piperidinophenyl)-phenoxy]-propionic acid amide.

EXAMPLE 14

10 g. of 2-methyl-2-[4-(1,2,3,4-tetrahydroquinolino)-phenoxy]-propionyl chloride (obtainable from the acid and SOCl₂) is heated with 100 ml. of absolute n-propanol to 95°for 3 hours. The mixture is then concentrated by evaporation, the residue mixed with dilute sodium hydroxide solution, and the aqueous solution is extracted with ether. The ether solution is washed twice with dilute NaOH and twice with water, dried, and the ether is removed by evaporation, thus obtaining the n-propyl ester of 2-methyl-2-

[4-(1,2,3,4-tetrahydroquinolino)-phenoxy]-propionic acid, b.p. 190°–200°/0.01 mm.

EXAMPLE 15

9 g. of 2-methyl-2-[4-(1,2,3,4-tetrahydroquinolino)-phenoxy]-propionyl chloride is dissolved in 100 ml. of absolute tetrahydrofuran and mixed with 3 g. of potassium tert.-butylate. The mixture is agitated at room temperature for 30 minutes, filtered, the filtrate concentrated by evaporation, worked up as described in Example 14, and the tert.-butyl ester of 2-methyl-2-[4-(1,2,3,4-tetrahydroquinolino)-phenoxy]-propionic acid is thus produced, b.p. 180°–185°/0.01 mm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

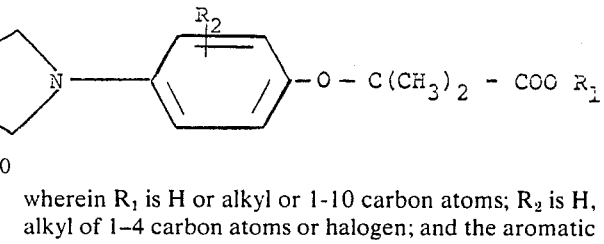

wherein $R_1$ is H or alkyl or 1-10 carbon atoms; $R_2$ is H, alkyl of 1-4 carbon atoms or halogen; and the aromatic ring of the isoindolino group is unsubstituted or substituted by one or two of methyl, methoxy, halogen or by methylenedioxy.

2. A compound of claim 1 wherein $R_1$ is H, $CH_3$ or $C_2H_5$.

3. A compound of claim 1 wherein $R_2$ is H.

4. A compound of claim 3 wherein $R_1$ is H, $CH_3$ or $C_2H_5$.

5. A compound of claim 1, 2-methyl-2-(4-isoindolino-phenoxy)-propionic acid.

6. A compound of claim 1, 2-methyl-2-(4-isoindolino-phenoxy)-propionic acid ethyl ester.

7. A compound of claim 1, 2-methyl-2-[4-(5,6-dimethoxy-isoindolino)-phenoxy]-propionic acid ethyl ester.

8. A compound of claim 1, 2-methyl-2-[4-(5,6-methylenedioxyisoindolino)-phenoxy]-propionic acid ethyl ester.

* * * * *